Feb. 13, 1940. J. COLAS 2,190,014
FILTER PACK
Filed Feb. 25, 1939
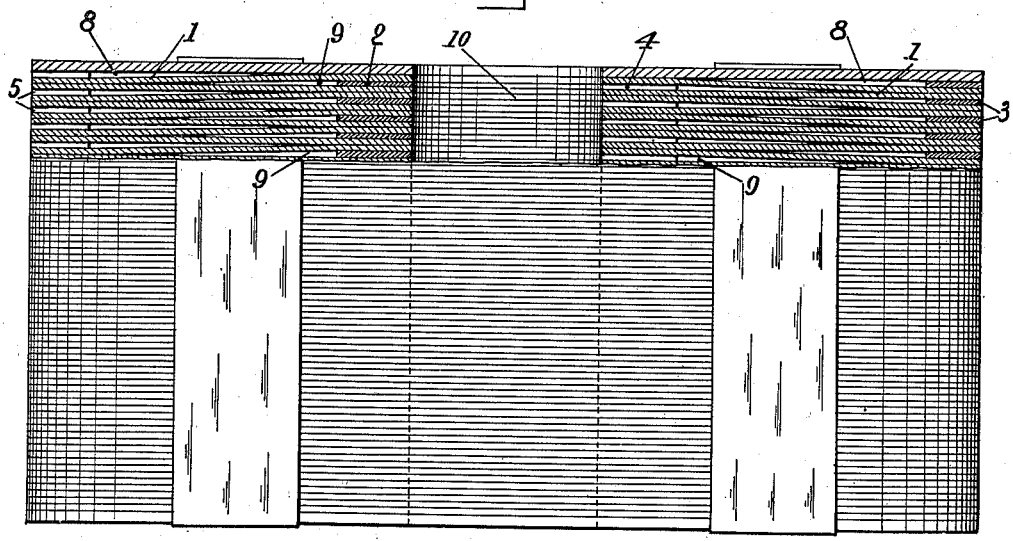
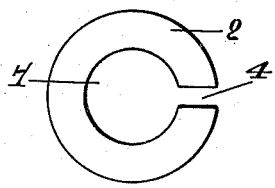
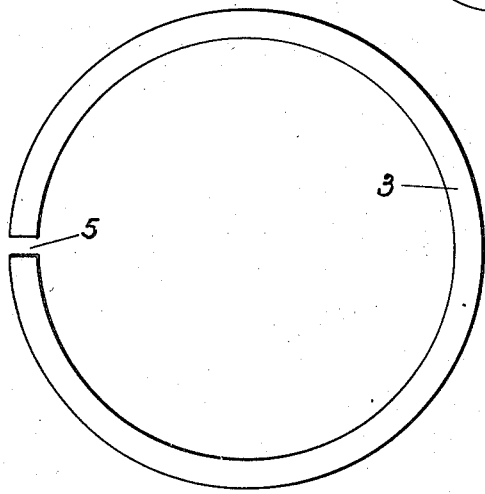
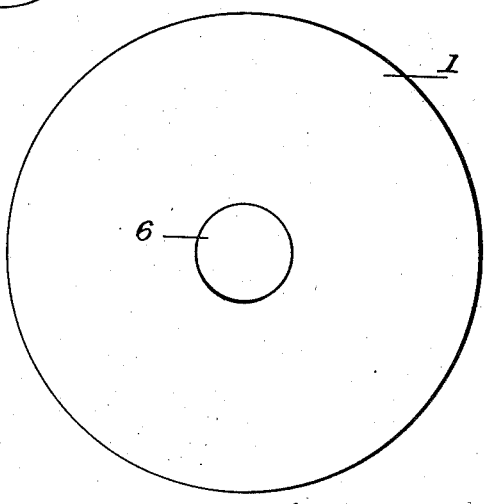
Inventor:
J. Colas
By E. F. Wenderoth
Atty

UNITED STATES PATENT OFFICE 2,190,014

FILTER PACK

Jacques Colas, Paris, France, assignor of one-half to Societe Alfa; one-sixth to Louis Colas; and one-sixth to Andre Colas, all of Paris, France Application February 25, 1939, Serial No. 258,565
In France March 1, 1938

6 Claims. (Cl. 210—169)

The present invention relates to a filter pack which is formed by piling one upon the other, filtering sheets and intercalary members of appropriate shape which are perforated at their centre and form two series of chambers which are alternately in communication with the outside of the pack and with the central passage formed by the perforations of the filtering sheets and optionally of the intercalary members. Said pack is more particularly intended for filtering gas-oil or other carburants and in a general manner all liquids, the liquid to be filtered penetrating into the pack through one of the series of chambers and escaping, when filtered, through the other series of chambers.

The present invention has for its object an embodiment of the elements forming said filter pack and consists, in particular, in giving the intercalary members, which are preferably made of the same substance as the filtering sheets themselves, the shape of circular or non circular rings which are broken at least at one point of their periphery and are, for example, generally shaped like a C.

In the accompanying drawing, which has been given by way of example and in order to facilitate the comprehension of the description:

Fig. 1 shows a section of a filter pack according to the present invention;

Figs. 2, 3 and 4 show respectively plan views of a central intercalary member, of a peripheral intercalary member, and of a filtering sheet.

Referring to the drawing, it will be seen that the intercalary members are shaped like a circle which is broken at one of its points by a slit 4 or 5 which serves for introducing the liquid into or letting same out of the filtering chambers formed by the space between the successive filtering sheets.

Preferably, for simplicity of mounting, the inlet orifices 5 are arranged below each other along one of the generatrices of the filter pack and the outlet orifices 4 are also arranged along a generatrix, but opposite the orifices 5 with respect to the axis of the system.

The filtering sheets are formed by a disc 1 provided at its centre with only one perforation 6 of the same diameter as the central hole 7 of the intercalary members 2, in such a manner that, by packing, a central passage is formed having this same diameter.

The whole arrangement of the various elements is packed according to any appropriate alternating method, if necessary adding unbroken rings alternating with the broken rings.

Thus for example, the pack shown in Fig. 1 is formed by piling on one another a filtering sheet 1, an intercalary member 2, another filtering sheet 1, an intercalary member 3, and so forth, the intercalary members 2 and 3 being used alternately.

The whole arrangement of elements forming the filter pack, after piling, is pressed and held by any appropriate means, preferably by simply cementing strips of strong paper along a plurality of its generatrices.

The liquid to be purified in the case of Fig. 1 penetrates through the orifice 5 into the series of chambers 8 which are limited by two sheets 1 and an intercalary member 3, passes through the sheets 1 whereby it is filtered and after having been filtered, passes into the other series of chambers 9 whence it flows through the opening 4 into the passage 10, formed by the superposition of the perforations 6 of the sheets 1 and of the holes 7 of the intercalary members 2.

I claim:

1. A filter pack comprising a plurality of filtering elements superposed alternately with intercalary members and forming a plurality of chambers, said intercalary members being of annular shape and at least one of same being broken at least at one point, thereby forming orifices for the inlet of liquid to and the outlet of same from said chambers, and means for holding said elements and members tightly packed together.

2. Filter pack according to claim 1, wherein said inlet orifices are arranged below each other along one of the generatrices of the filter pack, and the outlet orifices are also arranged along a generatrix, diametrically opposite the inlet orifices.

3. Filter pack according to claim 1, wherein said filtering elements are formed by a disk provided with a central perforation of the same diameter as that of the central hole of the intercalary members, thereby forming a central passage when said elements and members are packed together.

4. Filter pack according to claim 1, wherein unbroken annular intercalary members alternate with broken ones.

5. A filter pack comprising superposed filtering elements and annular inserts of different diameters, said filtering elements having central perforations and certain of said inserts having a less diameter than said filtering elements and having a central perforation of the same diameter as said perforations in said elements while the other inserts have a diameter substantially the same as said filtering elements and have a central perforation of greater diameter than the central perforation of said filtering elements, said filtering elements being interposed between an insert having a smaller diameter and an insert having a larger diameter so that when assembled the inner periphery of one filtering element is in contact with the inner periphery of an adjacent filtering element on one side while the outer periphery of said filtering element is in contact with the adjacent filtering element on the other side, said filtering elements and inserts forming compartments communicating by openings provided in the inserts alternately with the exterior of the pack and with the central channel formed by said central perforations, each annular insert being interrupted in its height at one point at least, so that the opening thus formed is limited by the interrupted edges of the insert and by the filtering elements themselves which limit the compartment.

6. A filter pack comprising superposed filtering elements and annular inserts of different diameters, said filtering elements having central perforations and certain of said inserts having a less diameter than said filtering elements and having a central perforation of the same diameter as said perforations in said elements while the other inserts have a diameter substantially the same as said filtering elements and have a central perforation of greater diameter than the central perforation of said filtering elements, said filtering elements being interposed between an insert having a smaller diameter and an insert having a larger diameter so that when assembled the inner periphery of one filtering element is in contact with the inner periphery of an adjacent filtering element on one side while the outer periphery of said filtering element is in contact with the adjacent filtering element on the other side, said elements and annular inserts forming compartments and said annular inserts being provided with openings so that communication may be had with said compartments alternately to the exterior of the pack and to the central channel formed by said central perforations.

JACQUES COLAS.